US009667082B2

(12) United States Patent
Ritter

(10) Patent No.: US 9,667,082 B2
(45) Date of Patent: May 30, 2017

(54) METHOD FOR MONITORING UTILIZATION OF AN ELECTROCHEMICAL ENERGY STORAGE DEVICE IN A MOTOR VEHICLE, AND MOTOR VEHICLE

(75) Inventor: Bernd Ritter, Böhmfeld (DE)

(73) Assignee: AUDI AG, Ingolstadt (DE)

(*) Notice: Subject to any disclaimer, the term of this patent is extended or adjusted under 35 U.S.C. 154(b) by 469 days.

(21) Appl. No.: 13/984,456

(22) PCT Filed: Feb. 6, 2012

(86) PCT No.: PCT/EP2012/000529
§ 371 (c)(1),
(2), (4) Date: Aug. 8, 2013

(87) PCT Pub. No.: WO2012/107198
PCT Pub. Date: Aug. 16, 2012

(65) Prior Publication Data
US 2013/0320756 A1 Dec. 5, 2013

(30) Foreign Application Priority Data
Feb. 8, 2011 (DE) .................. 10 2011 010 585

(51) Int. Cl.
H02J 7/00 (2006.01)
B60L 11/18 (2006.01)
H01M 10/42 (2006.01)

(52) U.S. Cl.
CPC ......... *H02J 7/0063* (2013.01); *B60L 11/1857* (2013.01); *B60L 11/1859* (2013.01);
(Continued)

(58) Field of Classification Search
CPC . H02J 7/0063; B60L 11/1859; B60L 2250/12; B60L 11/1861
(Continued)

(56) References Cited

U.S. PATENT DOCUMENTS 5,095,308 A * 3/1992 Hewitt ............. H04W 52/0245
324/433
5,357,203 A 10/1994 Landau et al.
(Continued)

FOREIGN PATENT DOCUMENTS

AT 506 272 7/2009
CN 101375482 A 2/2009
(Continued)

OTHER PUBLICATIONS

International Search Report issued by the European Patent Office in International Application PCT/EP2012/000529 on Apr. 22, 2012.
(Continued)

*Primary Examiner* — Rexford Barnie
*Assistant Examiner* — Thai Tran
(74) *Attorney, Agent, or Firm* — Henry M. Feiereisen LLC

(57) ABSTRACT

It should be possible in a motor vehicle having an electric drive to allow a deep discharge of the electrochemical energy storage device by a control input (S18), which is otherwise forbidden. In the present case, it is counted how often the deep discharge has occurred, and an event is preferably triggered when a threshold value (i-limit) has been reached for a predetermined number of times, specifically a warning signal is outputted and/or the subsequent deep discharge is blocked (S26).

4 Claims, 1 Drawing Sheet

(52) U.S. Cl.
CPC ....... *B60L 11/1861* (2013.01); *B60L 11/1862* (2013.01); *H01M 10/42* (2013.01); *H02J 7/0029* (2013.01); *B60L 2250/10* (2013.01); *H01M 2220/20* (2013.01); *H02J 2007/004* (2013.01); *H02J 2007/0037* (2013.01); *Y02T 10/705* (2013.01); *Y02T 10/7011* (2013.01); *Y02T 10/7044* (2013.01)

(58) Field of Classification Search
USPC .......................................................... 307/10.1
See application file for complete search history.

(56) References Cited

U.S. PATENT DOCUMENTS

| | | | |
|---|---|---|---|
| 5,652,498 | A | 7/1997 | Edye et al. |
| 5,942,878 | A | 8/1999 | Ito |
| 6,054,840 | A | 4/2000 | Nakanishi et al. |
| 6,198,254 | B1 | 3/2001 | Satake et al. |
| 2002/0084768 | A1* | 7/2002 | Youn .................... B60L 3/0046 320/104 |
| 2002/0149346 | A1* | 10/2002 | Sakakibara ........... H02J 7/0031 320/162 |
| 2006/0214627 | A1* | 9/2006 | Ito ........................ H01M 10/42 320/107 |
| 2008/0231284 | A1 | 9/2008 | Birke et al. |
| 2010/0033134 | A1* | 2/2010 | Funabashi ............. H02J 7/0029 320/136 |
| 2010/0211242 | A1* | 8/2010 | Kelty ...................... B60K 6/46 701/22 |

FOREIGN PATENT DOCUMENTS

| | | |
|---|---|---|
| DE | 38 32 839 | 3/1990 |
| DE | 38 32 840 | 3/1990 |
| DE | 195 03 917 | 8/1996 |
| DE | 693 32 925 | 3/2004 |
| DE | 698 20 017 | 6/2004 |
| DE | 102007021921 | 11/2008 |
| WO | WO 2007/048367 | 5/2007 |

OTHER PUBLICATIONS

Chinese Search Report issued by the Chinese Patent Office in Chinese Application 201280007934.7.

* cited by examiner

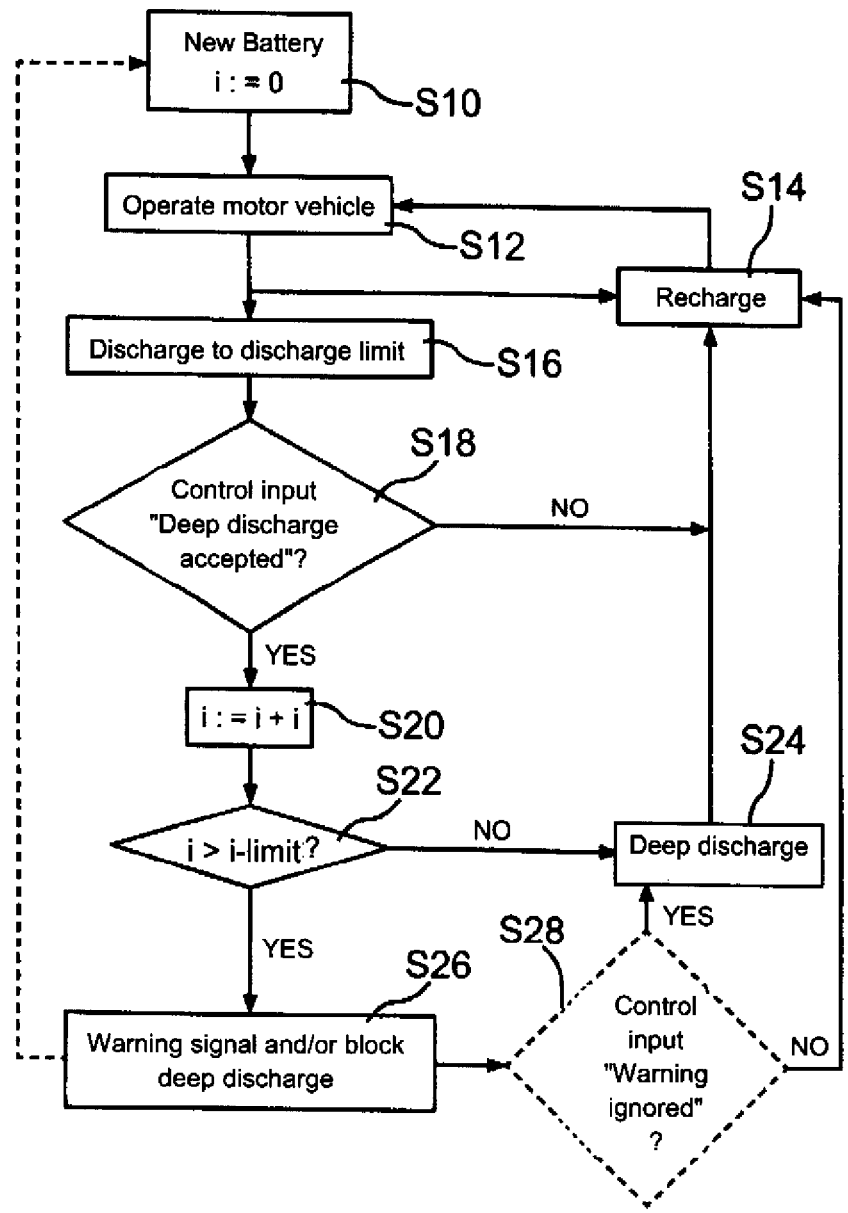

METHOD FOR MONITORING UTILIZATION OF AN ELECTROCHEMICAL ENERGY STORAGE DEVICE IN A MOTOR VEHICLE, AND MOTOR VEHICLE

CROSS-REFERENCES TO RELATED APPLICATIONS

This application is the U.S. National Stage of International Application No. PCT/EP2012/000529, filed Feb. 6, 2012, which designated the United States and has been published as International Publication No. WO 2012/107198 and which claims the priority of German Patent Application, Serial No. 10 2011 010 585.9, filed Feb. 8, 2011, pursuant to 35 U.S.C. 119(a)-(d).

BACKGROUND OF THE INVENTION

The invention relates to a method for monitoring utilization of an electrochemical energy storage device (a battery) in a motor vehicle, in which an electric drive is powered by the electrochemical energy storage device (electric current). In such a motor vehicle, the electrochemical energy storage device is discharged during continuing operation, when the electric drive is used. The electrochemical energy storage device can be charged at a charging station to which the vehicle is driven. The state of charge of the electrochemical energy storage device is important. State of charge refers to the level of the charge of the energy storage, wherein the state of charge is typically expressed as a percentage, with a state of charge of 0% referring to a completely discharged (to the minimum possible remaining charge) electrochemical energy storage device and the state of charge of 100% referring to the electrochemical energy storage device being charged to the maximum amount of charge. Typically, the percentage values are expressed proportional to the unit of charge (Coulomb).

An electrochemical energy storage device such as a lithium-ion battery usually suffers damage, when the state of charge is outside a predetermined range, i.e. when the state of charge is less then a specified minimum (during operation of the vehicle or of the electrical drive) or when the state of charge is greater than a specified maximum.

The normal operating mode of the motor vehicle is therefore a mode in which the state of charge of the electrochemical energy storage device remains in a predetermined range. Since this range is usually selected so as to provide a certain safety margin, the predetermined range may be left in exceptional cases.

This purpose it is known to allow the vehicle operator to provide an input (for example, the possibility of pressing a specific button, a particular key or by way of menu control), wherein the motor vehicle enters into a second operating mode in response to the input, wherein the battery is charged further.

A similar approach is also possible when a driver desires to reach a particularly high state of charge before staring to drive: In this case, the predetermined range is exceeded.

However, there is a risk that the operator abuses the special function and permanently damages the electrochemical energy storage.

DE 195 03 917 C2 discloses an electronic battery monitor with traction batteries for an electric vehicle wherein battery-related data are stored in a data store. The stored data include, among other things, information about the number of charge and discharge cycles, about deep discharges, about extreme values, etc. This is intended to provide tamper-proof information about the operating profile of the battery during its lifetime.

However, this does not include a situation where a driver may intentionally cause a deep discharge.

SUMMARY OF THE INVENTION

It is an object of the present invention to expand the possibilities of utilizing a vehicle with an electric drive powered by an electrochemical energy storage device by shifting the boundary for using the electrochemical energy storage device.

The problem is solved in one aspect by a method for monitoring utilization of an electrochemical energy storage device in a motor vehicle, wherein the electrochemical energy storage device supplies electric power to an electric drive, includes operating the motor vehicle in a first operating mode, wherein a state of charge of the electrochemical energy storage device remains in a predetermined range, and operating the motor vehicle in a second operating mode, wherein the state of charge leaves the predetermined range, counting how often the second operating mode is assumed, storing a count value in a data storage device of the motor vehicle, and assuming the second operating mode only in response to a control input for assuming the second operating mode and in another aspect by a motor vehicle with an electric drive, an electrochemical energy storage device supplying an electrical current to the electric drive, wherein a nominal minimum state of charge is associated with the electrochemical energy storage device, a device for causing an undershoot of the nominal minimum state of charge, a device for counting how many times the nominal minimum state of charge has been undershot, a device for storing a corresponding count value, and a control key configured to input a control input for a deep discharge. The nominal minimum state of charge is permitted to be undershot only upon detection of the control input.

According to the invention, it is counted how often the second operating mode is assumed, i.e. how often a state is assumed in which the state of charge is outside the predetermined range. A corresponding counter value is stored in a data storage device of the motor vehicle.

By performing active counting specifically relating to the assumption of the second operating mode of the motor vehicle, the related information may be used to optimize the use of the battery.

This optimization may be performed by human intervention, for example by a person reading the count value from a data storage device or having the count value displayed on a display.

Preferably, within the context of the method, the count value is compared with a threshold value, and an event is initiated (which inherently goes beyond just storing the count value), for example automatically, when the threshold value has been reached or exceeded.

The invention is based on the realization that in particular the state of charge may be outside the predetermined range for a limited number of times, without excessively damaging the electrochemical energy storage device. The boundaries of the predetermined range can then be defined, and the associated threshold value for the count value can be selected such that the electrochemical energy storage device is usable as much as possible. This may be accomplished by setting the predetermined range rather narrow and by setting the threshold value for the count value relatively high; conversely, the predetermined range may also be selected to be wider than usual, with the threshold value for the count value then selected to be rather low, so that the second mode of operation is assumed only as an exception.

In a preferred embodiment of the invention, the triggered event is no longer assumed (automatically by the motor vehicle), or can no longer be assumed (by a control input), or can only be assumed or is only assumed after an additional control input going beyond the control input that is otherwise required for assuming the second mode of operation.

Alternatively or in addition, the triggered event may also include outputting an acoustic, optical or haptic signal when the count value has reached or exceeded the threshold value, which may in particular have the effect of a warning signal, either for the occupants of the motor vehicle, in particular the driver, or for a person who is involved in the vehicle in any other way, including when the driver does not drive the vehicle, for example when he opens a door.

Therefore, people are informed by the triggered signal that a limit has been reached, which indicates how often the state of charge is allowed to leave the predetermined range, and that the electrochemical energy storage device must now be handled more gently or must be replaced in the long term.

An output signal may also be triggered independent of the output of the count value, in particular the count value itself may be outputted on an output device, either always (when the vehicle is operated), on demand, or at least when the second mode is assumed, thereby informing the driver about how closely he approaches the limit value.

Preferably, the method of the invention is used in a motor vehicle, wherein the second mode is assumed only in response to a control input for assuming the second mode, i.e. only in response an explicit control input. Storing the count value is hereby intended to be able to inform the driver about his own actions (actuating the control input).

Preferably, assumption of the second mode includes that the electrical energy storage device is deeply discharged below a lower limit. It is then also possible to alternatively or additionally implement the invention, when the electrochemical energy storage device is in the second operating mode overcharged above an upper limit; however, the problem of the deep discharge arises in particular when the vehicle is traveling, i.e. when the operating mode is simultaneously a driving mode, because the driver may desire to continue the trip when the battery is discharged to a minimum limit, so that a deep discharge may be desirable.

The motor vehicle according to the invention has an electric drive and an electrochemical energy storage device for supplying electric current to this electric drive, wherein a nominal minimum state of charge is assigned to the electrochemical energy storage device, i.e. a defined minimum state of charge. The motor vehicle also includes a device which causes the desired state of charge to be undershot, wherein the device causing the undershooting may be implemented, for example, as a software module in a control device for controlling the electric drive, which measures or calculates the state of charge of the electrochemical energy storage device and sends control commands to the electric drive in response to the state of charge, which then draws the electric current. The motor vehicle according to the invention is characterized by a device for counting how many times the set minimum state of charge has been undershot, and for storing a corresponding count value. The device may also be provided by two partial devices, wherein the partial device for counting may be coupled to count to the device for causing the undershooting, e.g. may be a corresponding software module in the control device of the motor vehicle, whereas the partial device for storing the respective count value may be a conventional data storage device.

The advantages of the invention described in conjunction with the method also apply to the vehicle according to the invention. The preferred embodiments of the method according to the invention are preferably implemented by the vehicle according to the invention.

In particular, in the motor vehicle according to the invention, that a cause the undershooting of the nominal minimum state of charge may preferably be blocked automatically after a limit for the count value has been reached or exceeded. Blocking may simply be implemented by preventing the associated control device from causing undershooting of the nominal minimum state of charge, when the limit or the limit value for the count value is reached. However, a separate hardware or software module may also compare the count value from the (partial) storage device with the threshold value and send a corresponding signal, for example in the form of setting a flag, to the device for causing of the undershoot, which then prevents any further action.

BRIEF DESCRIPTION OF THE DRAWING

A preferred embodiment of the invention will now be described with reference to the drawing in which the sole FIG. 1 is a flow diagram illustrating an embodiment of the method according to the present invention.

DETAILED DESCRIPTION OF PREFERRED EMBODIMENTS

A method for monitoring the utilization of a battery in an electric vehicle starts at the step S10 with the assumption that the battery is new, for example, because the vehicle itself is new, and a counter i is set to zero.

Thereafter, at step S12, operation of the motor vehicle begins. The battery is discharged during ongoing operation of the motor vehicle. The battery is charged again either at step S14 before reaching the discharge limit. In the present case, it is of interest what happens when the battery was discharged at step S16 to the discharge limit. The discharge limit is a limit that should not be undershot during normal operation because the battery would otherwise be damaged upon further discharge. This deep discharge should in the present example be allowed by user input in exceptional situations, for example when the driver presses a control button. At step S18, it is checked whether such user input has been performed. As long as this is not the case, the battery is charged again at step S14, with the operation of the vehicle then being continued according to step S12, so that the battery is discharged again at a later time, etc. Conversely, when a control input was performed, the counter i is incremented by one at step S20.

At step S22, it is then checked whether the counter has exceeded a threshold value i-limit. As long as this is not the case, a deep discharge is performed at step S24 according to the wish of the driver (i.e., his control input). The battery is subsequently charged again at step S14, the operation of the vehicle continues at step S12, etc. However, when the limit value i-limit has been exceeded, the process proceeds at step S22, that is subsequent to the control input, to step S26: An alarm signal is outputted and/or the additional deep discharge is blocked. The setting is hereby that the deep discharge should not be overly frequent, and the limit i-limit is defined for just this purpose. The vehicle operator is informed by the warning signal that he has performed a control input for an excessive number of times when the discharge limit was reached. Blocking the deep discharge prevents permanent damage to the battery. The process can then transition to recharge the battery according to step S14. Optionally, it can be checked at step S28 whether a further control input was performed, for example on an additional control button. With this option, the driver can specify that although he has recognized the warning, he still desires a deep discharge. The process then transitions to step S24, and the deep discharge occurs in spite of the fact that the threshold value i-limit has been exceeded, with recharging occurring at a later time.

Depending on the setting of the limit value i-limit, it may be advisable after step S26 to replace the battery and thus to move back to step S10.

This can optionally (not shown in the FIGURE) also be made contingent on whether another threshold value for the counter i has been exceeded. Likewise, this can also be made contingent on a count of how many times the control input was performed, that the warning is ignored, i.e. how many times the question at step 28 has been answered with "Yes".

With the present invention, the discharge limit may be set higher or lower than is customary when an exact threshold value i-limit is chosen. A larger threshold value i-limit can be chosen at high discharge limit, the deep discharge should be the absolute exception at low discharge limit and the threshold value i-limit should be small. This can be adapted to the battery characteristics in an individual situation; optionally, the discharge limit and the threshold value i-limit may also be set as a function of battery parameters. Such battery parameters can be redefined, e.g. when replacing the battery, and/or may be read from a memory device on the battery. In the present example, however, the discharge limit and the threshold value i-limit can also be reset depending on battery parameters associated with a particular battery, for example parameters describing an aging state of the battery. This can come to full circle and the counter i can be considered when determining the threshold value i-limit, if additional parameters are viewed as functionally depending therefrom. For example, the total operating time can also be considered. The discharge limit and the threshold value i-limit can therefore be redefined dynamically as well as dependent on the particular battery.

The invention claimed is:

1. A method for monitoring utilization of an electrochemical energy storage device in a motor vehicle, wherein the electrochemical energy storage device supplies electric power to an electric drive, comprising:
    operating the motor vehicle in a first operating mode, wherein a state of charge of the electrochemical energy storage device remains in a predetermined range, and operating the motor vehicle in a second operating mode in response to an input, said input being pressing a button, a key or by way of a menu control, wherein in the second operating mode, the electrochemical energy storage device is deep-discharged below a lower limit and the state of charge leaves the predetermined range,
    counting how often the second operating mode happens,
    storing a count value in a data storage device of the motor vehicle,
    comparing the count value with a threshold value, and
    triggering an event, wherein the event includes outputting an acoustic, visual and haptic signal when the threshold value has been reached or exceeded and the event prevents the second operating mode from happening.

2. The method of claim 1, further comprising outputting the count value on an output device during operation of the motor vehicle either continuously, or on demand, or when the second operating mode happens.

3. A motor vehicle comprising:
    an electric drive,
    an electrochemical energy storage device supplying an electrical current to the electric drive, wherein a nominal minimum state of charge is associated with the electrochemical energy storage device,
    a first operating mode, wherein a state of charge of the electrochemical energy storage device remains in a predetermined range, and operating the motor vehicle in a second operating mode in response to an input, said input being pressing a button, a key or by way of a menu control, wherein the state of charge leaves the predetermined range,
    a device for causing an undershoot of the nominal minimum state of charge,
    a device for counting how many times the nominal minimum state of charge has been undershot, comparing the count value with a threshold value, and triggering an event when the threshold value has been reached or exceeded, wherein the event prevents the second operating mode from happening,
    a device for storing a corresponding count value, and
    a control key configured to input an operator input for a deep discharge,
    wherein undershooting the nominal minimum state of charge is permitted only upon detection of the operator input.

4. The motor vehicle of claim 3, wherein an undershoot of the nominal minimum state of charge is automatically blocked when the count value has reached or exceeded a threshold value.

* * * * *